(12) United States Patent
Mizutani

(10) Patent No.: US 11,388,299 B2
(45) Date of Patent: Jul. 12, 2022

(54) NON-TRANSITORY STORAGE MEDIUM STORING PLURALITY OF INSTRUCTIONS READABLE BY INFORMATION PROCESSING APPARATUS AND SCAN SYSTEM

(71) Applicant: Brother Kogyo Kabushiki Kaisha, Nagoya (JP)

(72) Inventor: Aiko Mizutani, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/166,084

(22) Filed: Feb. 3, 2021

(65) Prior Publication Data

US 2021/0250452 A1 Aug. 12, 2021

(30) Foreign Application Priority Data

Feb. 12, 2020 (JP) .............................. JP2020-021276

(51) Int. Cl.
*H04N 1/00* (2006.01)
*H04N 1/04* (2006.01)
*H04N 1/32* (2006.01)

(52) U.S. Cl.
CPC ..... *H04N 1/00482* (2013.01); *H04N 1/00129* (2013.01); *H04N 1/00408* (2013.01); *H04N 1/00973* (2013.01); *H04N 1/04* (2013.01); *H04N 1/32545* (2013.01)

(58) Field of Classification Search
CPC ........... H04N 1/00482; H04N 1/00129; H04N 1/00408; H04N 1/00973; H04N 1/04; H04N 1/32545; H04N 1/00413; H04N 1/00811; H04N 1/00938; H04N 1/0097
See application file for complete search history.

(56) References Cited

U.S. PATENT DOCUMENTS

| | | | |
|---|---|---|---|
| 2012/0127541 A1* | 5/2012 | Kishida | H04N 1/00228 358/474 |
| 2016/0072971 A1* | 3/2016 | Ozaki | H04N 1/00413 358/1.15 |
| 2017/0094081 A1 | 3/2017 | Sato | |
| 2019/0102126 A1 | 4/2019 | Mizutani et al. | |
| 2019/0303075 A1* | 10/2019 | Yamada | G06F 3/1254 |

FOREIGN PATENT DOCUMENTS

| | | |
|---|---|---|
| JP | 2017-069643 A | 4/2017 |
| JP | 2019-067041 A | 4/2019 |

\* cited by examiner

*Primary Examiner* — Iriana Cruz

(74) *Attorney, Agent, or Firm* — Burr & Brown, PLLC

(57) ABSTRACT

A non-transitory storage medium stores a plurality of instructions readable by a computer of an information processing apparatus. The information processing apparatus comprises a display, an operation unit, and a communication interface. The information processing apparatus stores a first execution program and a second execution program. The information processing apparatus displays a setting screen including a first particular setting capable of being designated in scan processing executed by the first execution program and incapable of being designated in scan processing executed by the second execution program, and determines to adopt the first execution program as the execution program that executes the scan processing in a case where the first particular setting is designated on the setting screen by an operation to the operation unit.

12 Claims, 9 Drawing Sheets

NON-TRANSITORY STORAGE MEDIUM STORING PLURALITY OF INSTRUCTIONS READABLE BY INFORMATION PROCESSING APPARATUS AND SCAN SYSTEM

CROSS REFERENCE TO RELATED APPLICATION

The present application claims priority from Japanese Patent Application No. 2020-021276, which was filed on Feb. 12, 2020, the disclosure of which is herein incorporated by reference in its entirety.

BACKGROUND

The following disclosure relates to a non-transitory storage medium storing a plurality of instructions readable by an information processing apparatus capable of communicating with a scanner, and a scan system. More specifically, the disclosure relates to a technique related to a user interface for executing scan settings.

In the information processing apparatus capable of communicating with devices such as a scanner, there is known a technique which receives various settings related to scanning through a user interface provided by an application program or a scanner driver. For example, in this conventional information processing apparatus, a portable terminal displays a screen configured to receive scan settings on a touch panel to receive various settings.

SUMMARY

In recent years, there is provided an information processing apparatus having a so-called driverless scanning function in which reading is executed in accordance with a prescribed standard without using the scanner driver as typified by, for example, AirPrint (registered trademark). In such information processing apparatus, a scan instruction is transmitted to a scanner in accordance with the prescribed standard by using a general-purpose scan control function provided by an operating system (hereinafter referred to as "OS"). Then, the scanner reads an image of an original and transmits image data as a read result to the information processing apparatus in accordance with the prescribed standard.

When using the general-purpose scan control function, the number of available items of scan settings tends to be small and there is a case where it is difficult to provide an image with user's desired quality. As an example for solving the problem, it can be considered that a particular scan control function corresponding to a particular scanner is separately provided for realizing more detailed scan settings. The information processing apparatus provided with the particular scan control function can add scan settings specialized to the scanner to a scan instruction. It is also possible to correct the image data as the read result so as to correspond to the scan settings specialized to the scanner. Accordingly, the information processing apparatus provided with two types of, namely, both general-purpose and particular scan control functions has a plurality of control programs used for scan processing even when causing the same scanner to execute reading.

In the case where the plurality of control programs used for scan processing are provided, items which can be set differ according to programs, therefore, a configuration in which setting screens for scan settings are provided for respective programs can be considered. However, since there are many users not requiring advanced scan settings, it may be not so important that which control program executes the scanning. Such users may be confused when the setting screen is switched according to the control program.

An aspect of the disclosure relates to a technique capable of avoiding user's confusion in scan settings used for scan processing when there are a plurality of control programs used for the scan processing.

In one aspect of the disclosure, a non-transitory storage medium stores a plurality of instructions readable by a computer of an information processing apparatus. The information processing apparatus includes a display, an operation unit, and a communication interface connectable to a scanner. The information processing apparatus stores a first execution program and a second execution program different from the first execution program each as an execution program that executes scan processing for causing scanner to scan an original and causing the information processing apparatus to receive a read result from the scanner. When executed by the computer, the plurality of instructions cause the information processing apparatus to display a setting screen for receiving a scan setting used for the scan processing on the display, the scan setting including a first particular setting capable of being designated in scan processing executed by the first execution program and incapable of being designated in scan processing executed by the second execution program, and, in a case where the first particular setting is designated on the setting screen by an operation to the operation unit, determine to adopt the first execution program as the execution program that executes the scan processing.

In another aspect of the disclosure, a scan system includes an information processing apparatus, and a scanner configured to communicate with the information processing apparatus. The information processing apparatus is configured to store a first execution program and a second execution program different from the first execution program each as an execution program that executes a scan processing for causing the scanner to read an original and causing the information processing apparatus to receive a read result from the scanner, display a setting screen for receiving a scan setting used for the scan processing on a display, the scan setting including a first particular setting capable of being designated in a scan processing executed by the first execution program and incapable of being designated in a scan processing executed by the second execution program, and, when the first particular setting is designated on the setting screen, determine to adopt the first execution program as the execution program that executes the scan processing.

BRIEF DESCRIPTION OF THE DRAWINGS

The objects, features, advantages, and technical and industrial significance of the present disclosure will be better understood by reading the following detailed description of the embodiments, when considered in connection with the accompanying drawings, in which.

EMBODIMENTS

Hereinafter, an embodiment embodying a scan system will be explained in detail with reference to the attached drawings. The embodiment discloses the scan system including a plurality of scanners and a personal computer (hereinafter referred to as "PC") connected to each of the scanners.

Figure 1:
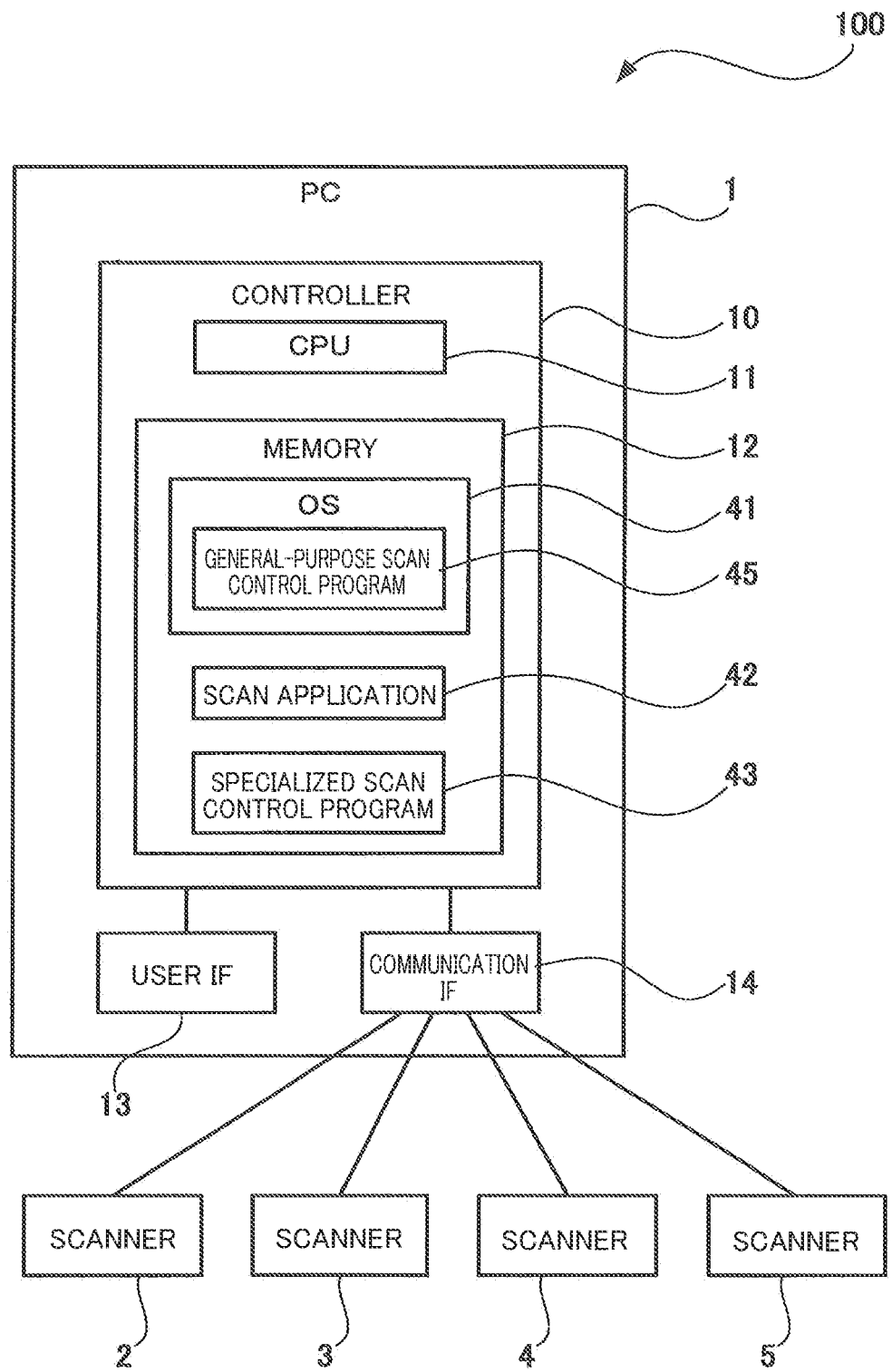
FIG. 1 is a schematic configuration diagram of a scan system according to an embodiment.

A scan system 100 according to an embodiment is a system including a PC 1 and a plurality of scanners which are a scanner 2, a scanner 3, a scanner 4, and a scanner 5 as illustrated in FIG. 1, which can be connected to one another. The PC 1 is an apparatus executing transmission of scan execution instructions to the scanners 2 to 5, reception of image data from the scanners 2 to 5, edition of received image data and the like. The PC 1 is an example of an information processing apparatus.

The scanners 2 to 5 are devices each having a communication function with respect to the PC 1, and an image reading function configured to read an image of an original and obtain image data. Devices of the same model may be included in the scanners 2 to 5. The scanners 2 to 5 are not limited to devices specialized to scanning, but may be multifunction devices, copy machines, or FAX machines.

The PC 1 according to the embodiment includes a controller 10 having a CPU 11 and a memory 12 as illustrated in FIG. 1. The PC 1 also includes a user interface (hereinafter referred to as "user IF") 13 and a communication interface (hereinafter referred to as "communication IF") 14, which are electrically connected to the controller 10. The controller 10 in FIG. 1 is a general term used when hardware and software used for controlling the PC 1 are collectively called, which does not always represent single hardware existing in the PC 1.

The CPU 11 executes various processing in accordance with programs read out from the memory 12 or based on operations of a user. The memory 12 is a storage area for storing various programs such as a startup program for starting the PC 1 and various application programs (hereinafter referred to as "applications") for using the scanners, various data such as image data and document data, and various setting information. The memory 12 is also used as a work area when various processing is executed.

The user IF 13 is, for example, a touch panel, including hardware configured to display a screen for informing the user of information, and hardware configured to receive operations by the user. The user IF 13 is an example of a display, and an example of an operation unit. The user IF 13 may be a pair of a display and a keyboard, a mouse, or a trackball.

The communication IF 14 includes hardware for communicating with external devices such as the scanners 2 to 5. A communication standard of the communication IF 14 is Ethernet (registered trademark), Wi-Fi (registered trademark), or the like. The communication IF 14 may be used in wired and wireless communications. The communication IF 14 may also include a plurality of configurations conforming to a plurality of communication standards.

The memory 12 of the PC 1 stores various data and various programs including an OS 41, a scan application 42, and a specialized scan control program 43 as illustrated in FIG. 1. A general-purpose scan control program 45 is incorporated in the OS 41. Both the specialized scan control program 43 and the general-purpose scan control program 45 are control programs for causing the scanners 2 to 5 to execute scanning. The specialized scan control program 43 is an example of a first execution program, and the general-purpose scan control program 45 is an example of a second execution program. The OS 41 is, for example, iOS (registered trademark), Android (registered trademark), Microsoft Windows (registered trademark), mac OS (registered trademark), or Linux (registered trademark).

The scan application 42 is an application configured to receive various instructions related to scanning. The scan application 42 receives user's instructions such as a designation of a scanner allowed to execute scanning, a designation of a saving location or a file format of the read result, an instruction of execution of scanning and various scan settings. The scan application 42 may further receive instructions of display of an image or edition of an image as the read result received from the scanner.

The specialized scan control program 43 is a specialized program configured to control the operation of the scanner so as to conform to a model of the scanner. The specialized scan control program 43 is a program conforming to only scanners of a particular model, which is, for example, provided from a manufacturer of scanners or the like. Accordingly, the program does not conform to scanners other than the scanners of the particular model, such as scanners of other manufacturers' models. The specialized scan control program 43 can conform to all detailed scan settings which can be executed by conforming scanners. The specialized scan control program 43 also has a function of searching for conforming scanners by itself and a function of correcting image data obtained from the scanner.

In the scan system 100 according to the embodiment, assume that the PC 1 includes the specialized scan control program 43 conforming to the scanners 2 to 4, and does not include a specialized scan control program 43 conforming to the scanner 5. There may be specialized scan control programs 43 conforming to the scanners 2 to 4 which are different from one another; however, they are not distinguished and referred to merely as the specialized scan control programs 43. The specialized scan control program 43 may be executed alone as well as executed as part of the scan application 42.

The general-purpose scan control program 45 is a program configured to control the operation of scanners based on a prescribed standard. The general-purpose scan control program 45 is a program used as a scan control function possessed by the OS 41, which is a standard program provided by the OS 41. The general-purpose scan control program 45 is a general-purpose program conforming to scanners in a plurality of models configured to support the prescribed standard. Accordingly, scanners made by any manufacturer can execute scanning based on the standard as long as the scanners have the function corresponding to the general-purpose scan control program 45. The OS 41 has a function in which, for example, when the scanner is newly connected to the PC 1, whether the general-purpose scan control program 45 is applicable to the newly connected scanner or not is determined, and information of the applicable scanner is registered in the memory 12.

As the general-purpose scan control program 45 is a general-purpose program conforming to scanners of the plurality of models made by different manufacturers, receivable scan settings are limited to general settings. Accordingly, the general-purpose scan control program 45 does not always receive all scan settings which can be executed by a designated scanner. As scan systems using the general-purpose scan control program 45, for example, AirPrint, Mopria (both are registered trademark) can be cited. In the scan system 100 according to the embodiment, assume that the scanners 2, 3, and 5 support the standard of the general-purpose scan control program 45, and the scanner 4 does not support the standard of the general-purpose scan control program 45.

Figure 2:
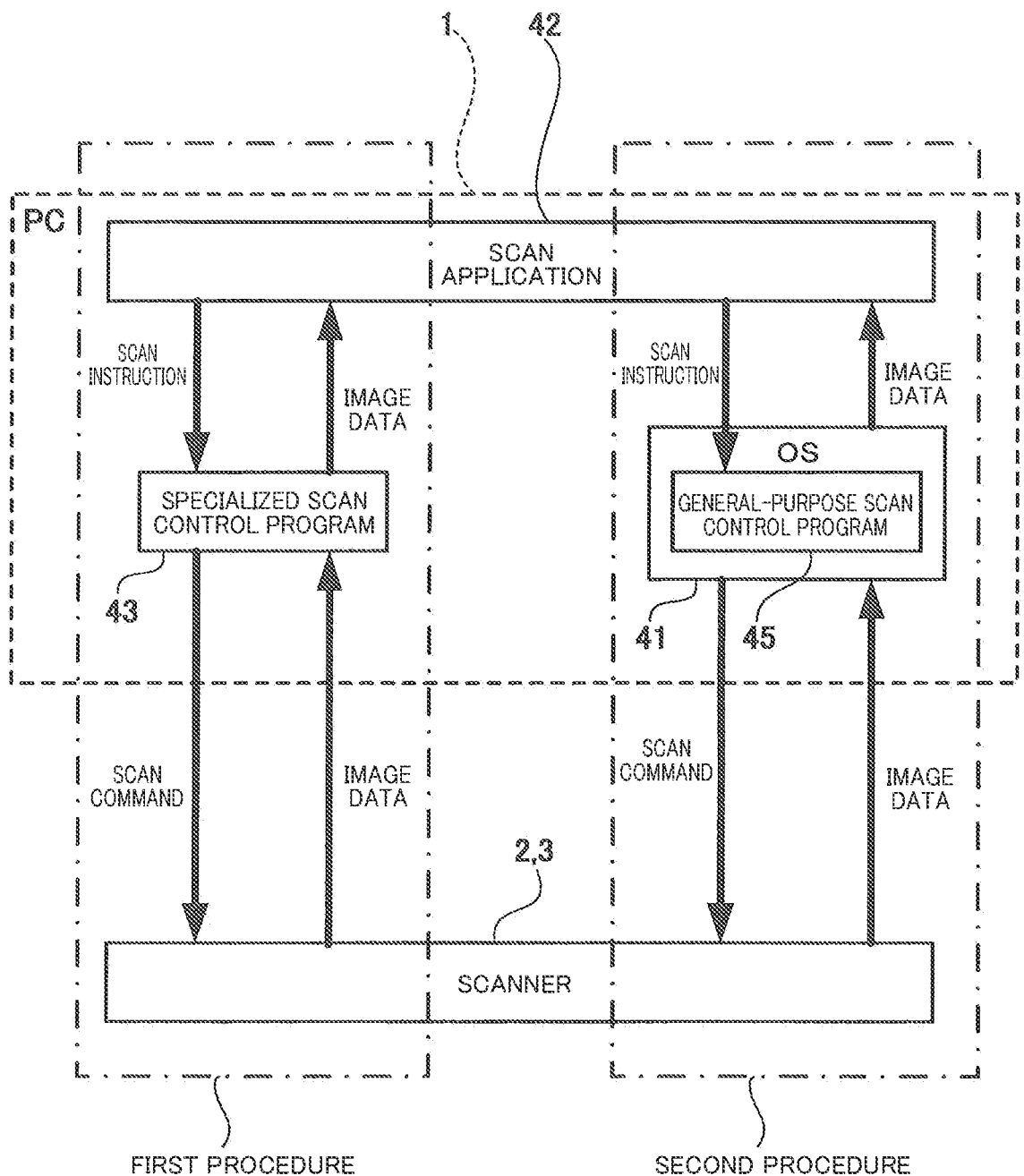
FIG. 2 is an explanatory diagram illustrating two kinds of routes of processing.

The PC 1 according to the embodiment includes the specialized scan control program 43 and the general-purpose scan control program 45 as programs used for processing causing the scanners 2 to 5 to execute scanning, therefore, the PC 1 can pass a scan command to the scanners 2 to 5 by using either of them. The scanner 2 and the scanner 3 are scanners to which both the specialized scan control program 43 and the general-purpose scan control program 45 are applicable. Accordingly, when the scanner 2 or the scanner 3 is selected as a device allowed to execute scanning, the PC 1 can execute both scan processing by two kinds of procedures as illustrated in FIG. 2.

A first procedure of the scan processing is a procedure of transmitting a scan command to the scanner by using the specialized scan control program 43, which is the procedure in which image data transmitted from the scanner is received through the specialized scan control program 43. The specialized scan control program 43 is not included in the OS 41, therefore, the PC 1 does not use the scan control function (for example, the general-purpose scan control program 45) included in the OS 41 in a case where the first procedure is executed. As the first procedure uses the specialized scan control program 43, all scan settings which can be executed by the designated scanner can be received.

A second procedure of the scan processing is a procedure of transmitting a scan command to the scanner by using the general-purpose scan control program 45, which is the procedure in which image data transmitted from the scanner is received through the OS 41. The second procedure uses the general-purpose scan control program 45 which is the scan control function included in the OS 41, therefore, it is not always possible to receive all scan settings which can be executed by the designated scanner. For example, the general-purpose scan control program 45 does not conform to high-resolution scan settings with which only particular model can dealt. Accordingly, in a case where the second procedure is executed, scan settings with resolutions which can be dealt with by many models, namely, scan settings with resolutions other than the high resolution are used.

On the other hand, the scanner 4 is not a device to which the general-purpose scan control program 45 is applicable, and the PC 1 includes the specialized scan control program 43 conforming to the scanner 4. Therefore, in a case where the scanner 4 is selected as the device allowed to execute scanning, the PC 1 can execute only the first procedure. The scanner 5 is a device to which the general-purpose scan control program 45 is applicable, and the PC 1 does not have a specialized scan control program conforming to the scanner 5. Therefore, in a case where the scanner 5 is selected as the device allowed to execute scanning, the PC 1 can execute only the second procedure.

The scan application 42 according the embodiment is a program which can execute both the first procedure and the second procedure. When the scan application 42 receives instructions for executing scanning by the scanners 2 to 5, the scan application 42 determines which procedure is used, and passes a scan instruction for instructing the transmission of the scan command to the control program used in the determined procedure. When the scan application 42 determines to use the first procedure, the scan application 42 passes the scan instruction to the specialized scan control program 43 and receives image data from the specialized scan control program 43 as illustrated in FIG. 2. On the other hand, when the scan application 42 determines to use the second procedure, the scan application 42 passes the scan instruction to the general-purpose scan control program 45 and receives image data from the OS 41 as illustrated in FIG. 2.

Next, a procedure of scan execution processing by the scan application 42 in the scan system 100 according to the embodiment will be explained with reference to a flowchart of FIG. 3. The scan execution processing is executed by the CPU 11 of the PC 1 after the scan application 42 is started.

Figure 4:
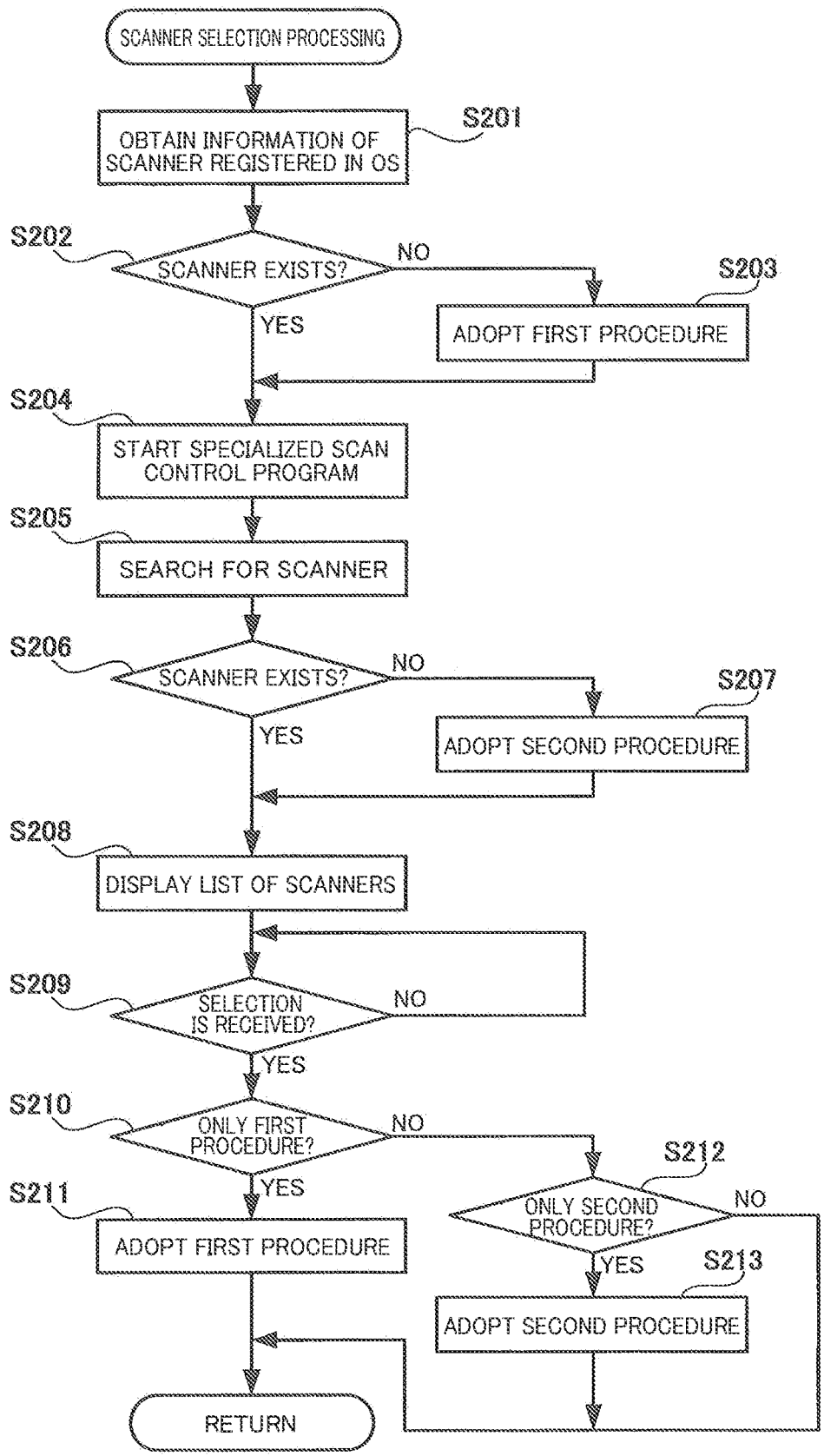
FIG. 4 is a flowchart illustrating a procedure of scanner selection processing.

In the scan execution processing, the CPU 11 executes scanner selection processing first (S101). The scanner selection processing is processing of receiving selection of the scanner allowed to execute scanning. A procedure of the scanner selection processing will be explained with reference to a flowchart of FIG. 4.

In the scanner selection processing, the CPU 11 obtains information of scanners registered in the OS 41 from the OS 41 (S201). When the scanner to which the general-purpose scan control program 45 is applicable is connected to the PC 1, the OS 41 registers information of the applicable scanner. At S201, the information of the registered scanner is obtained. The CPU 11 determines whether there exists a scanner registered in the OS 41 or not (S202). When it is determined that there is no scanner registered in the OS 41 (S202: NO), the CPU 11 determines to adopt the first procedure as the procedure of the scan processing (S203). That is, the CPU 11 determines to adopt the specialized scan control program 43 as the control program used for the scan processing. A processing executed at S203 is an example of determining processing. In a case where the scanner which can execute scanning using the general-purpose scan control program 45 is not registered, the first procedure is adopted as the procedure of the scan processing in advance to thereby prevent a situation that it is incapable of executing scanning.

After S203, or when it is determined that there exists a scanner registered in the OS 41 (S202: YES), the CPU 11 starts the specialized scan control program 43 (S204), and searches for the scanner connected to the PC 1 through the specialized scan control program 43 (S205). The scanner to be searched for at S205 is a scanner to which the specialized scan control program 43 is applicable.

Then, the CPU 11 determines whether there exists a scanner to which the specialized scan control program 43 is applicable or not (S206). When it is determined that there is no scanner to which the specialized scan control program 43 is applicable (S206: NO), the CPU 11 determines to adopt the second procedure as a procedure of scan processing (S207). That is, the general-purpose scan control program 45 is determined to be adopted as the control program used for scan processing. In a case where the scanner to which the specialized scan control program 43 is applicable is not found or in a case where it is incapable of executing scanning because the power of the scanner to which the specialized scan control program 43 is applicable is off or due to other reasons, the second procedure is adopted as the procedure of scan processing in advance to thereby prevent the situation that it is incapable of executing scanning. In a case where there are a plurality of specialized scan control programs 43, the CPU 11 sequentially attempts searching through all specialized scan control programs 43.

After S207 or when it is determined that there exists the scanner to which the specialized scan control program 43 is applicable (S206: YES), the CPU 11 displays a list of scanners and receives selection of the user (S208). On the list to be displayed, scanners information of which has been obtained at S201 and scanners which have been searched for at S205 are displayed, and the scanner included in both is displayed as one scanner. In the scan system 100 according to the embodiment, the scanners 2, 3 are scanners information of which has been obtained at S201 as well as searched for at S205, and they are each displayed as one scanner.

The CPU 11 determines whether selection of the user has been received or not (S209). When it is determined that the selection has not been received (S209: NO), the CPU 11 waits until the selection is received. When it is determined that the selection has been received (S209: YES), the CPU 11 determines whether the selected scanner is a scanner to which only the first procedure is applicable or not (S210). Specifically, in a case where the selected scanner is the scanner which has been searched for at S205, not the scanner information of which has been obtained at S201, the CPU 11 determines that only the first procedure is applicable to the scanner.

When it is determined that only the first procedure is applicable (S210: YES), the CPU 11 determines to adopt the first procedure as the procedure of scan processing (S211). For example, in a case where the scanner 4 is selected in the scan system 100 according to the embodiment, the first procedure is adopted as the procedure of the scan processing. In a case where the selected scanner is not registered in the OS 41, the first procedure is adopted as the procedure of scan processing in advance to thereby prevent the situation that it is incapable of executing scanning by the selected scanner.

When it is determined that the scanner is not a scanner to which only the first procedure is applicable (S210: NO), the CPU 11 determines whether the selected scanner is a scanner to which only the second procedure is applicable or not (S212). Specifically, when the selected scanner is the scanner information of which has been obtained at S201 and is not the scanner which has been searched for at S205, the CPU determines that only the second procedure is applicable to the scanner.

When it is determined that only the second procedure is applicable to the scanner (S212: YES), the CPU 11 determines to adopt the second procedure as the procedure of scan processing (S213). For example, in a case where the scanner 5 is selected in the scan system 100 according to the embodiment, the second procedure is adopted as the procedure of scan processing. In a case where the selected scanner is not included in the scanners which have been searched for at S205, it can be considered that it is incapable of executing scanning because the selected scanner is not the scanner to which the specialized scan control program 43 is applicable, that the power of the selected scanner is off or some other reasons. Accordingly, the second procedure is determined as the procedure of scan processing in advance to thereby prevent the situation that it is incapable of executing scanning by the selected scanner.

After S211 or S213, or when it is determined that the scanner is not the scanner to which only the second procedure is applicable (S212: NO), the CPU 11 ends the scanner selection processing and returns to the scan execution processing. For example, in a case where the scanner 2 or the scanner 3 is selected in the scan system 100 according to the embodiment, each of these scanners is the scanner information of which has been obtained at S201 and the scanner searched for at S205; therefore, the procedure of scan processing is not determined only by the selection of the scanner.

Figure 3:
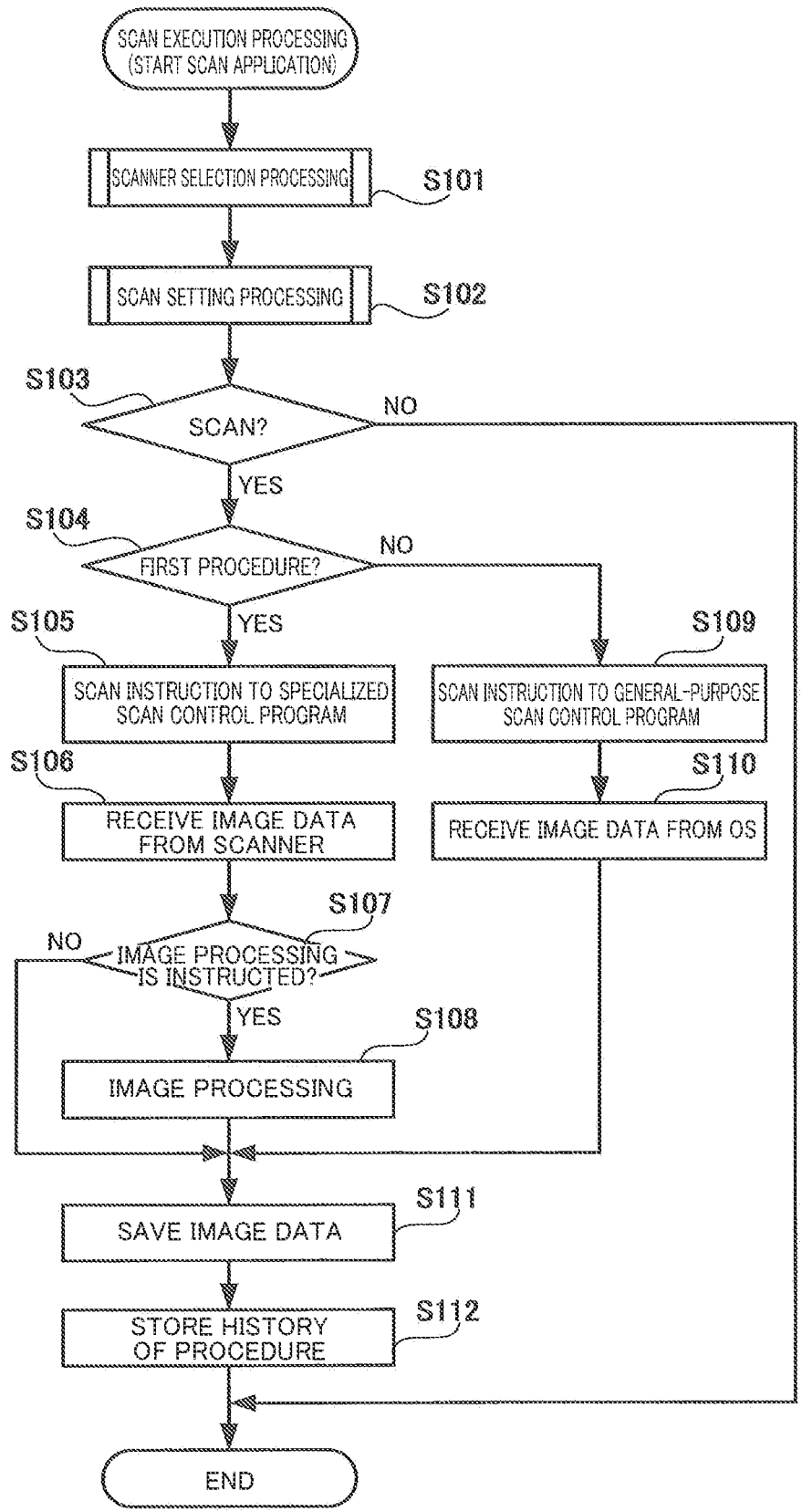
FIG. 3 is a flowchart illustrating a procedure of scan execution processing.
Figure 5:
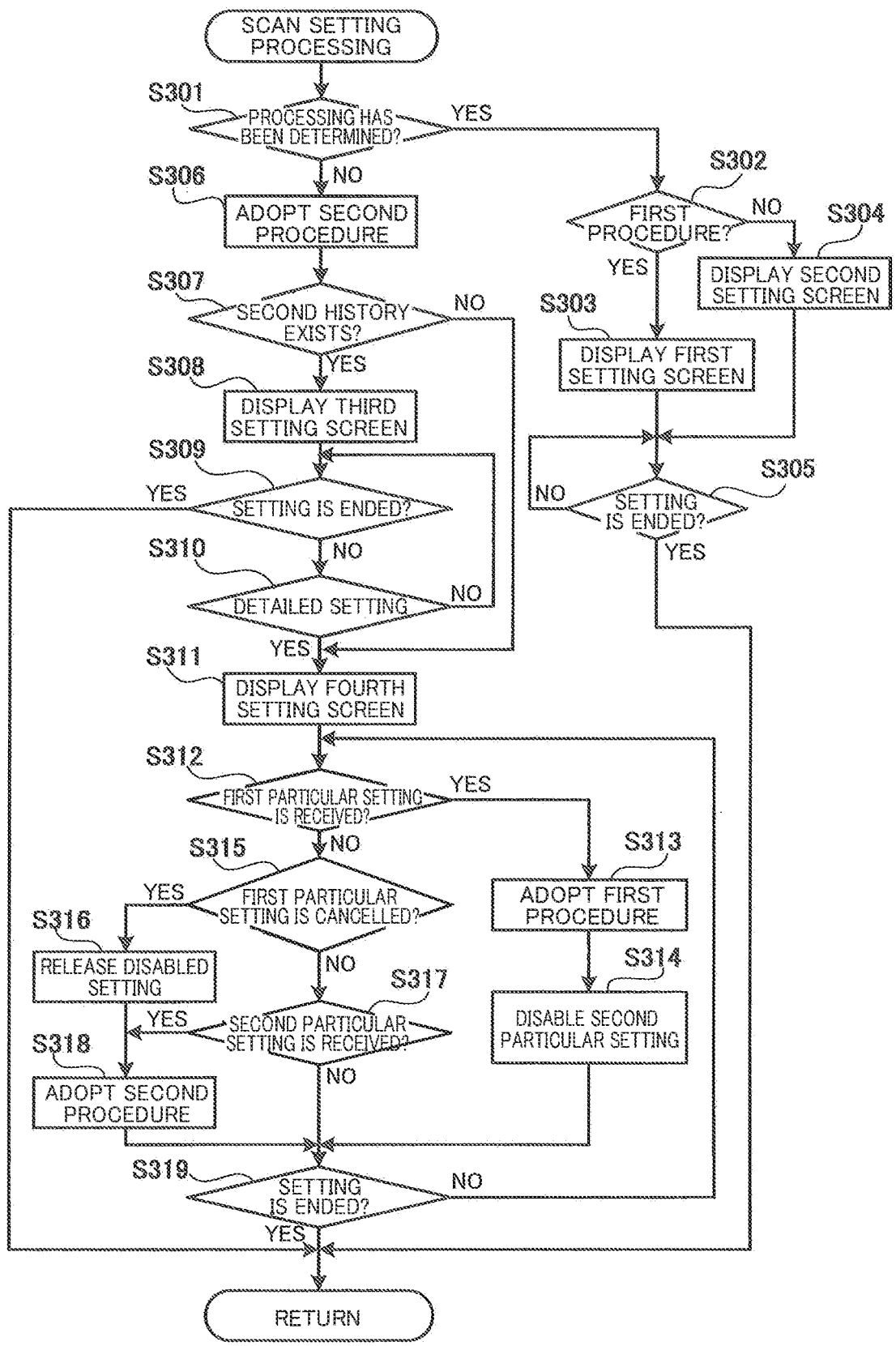
FIG. 5 is a flowchart illustrating a procedure of scan setting processing.

Explanation returns to the scan execution processing in FIG. 3. In the scan execution processing, the CPU 11 executes scan setting processing after the scanner selection processing of S101 (S102). The scan setting processing is processing in which various settings related to scanning are received. A procedure of the scan setting processing will be explained with reference to a flowchart of FIG. 5.

In the scan setting processing, the CPU 11 determines whether the procedure of the scan processing has been determined in the above scanner selection processing or not (S301). When it is determined that the procedure has been determined (S301: YES), the CPU 11 determines whether the first procedure has been adopted or not (S302). When it is determined that the first procedure has been determined to be adopted (S302: YES), the CPU 11 allows the user IF 13 to display a first setting screen (S303) and receives an operation to the displayed screen.

Figure 6:
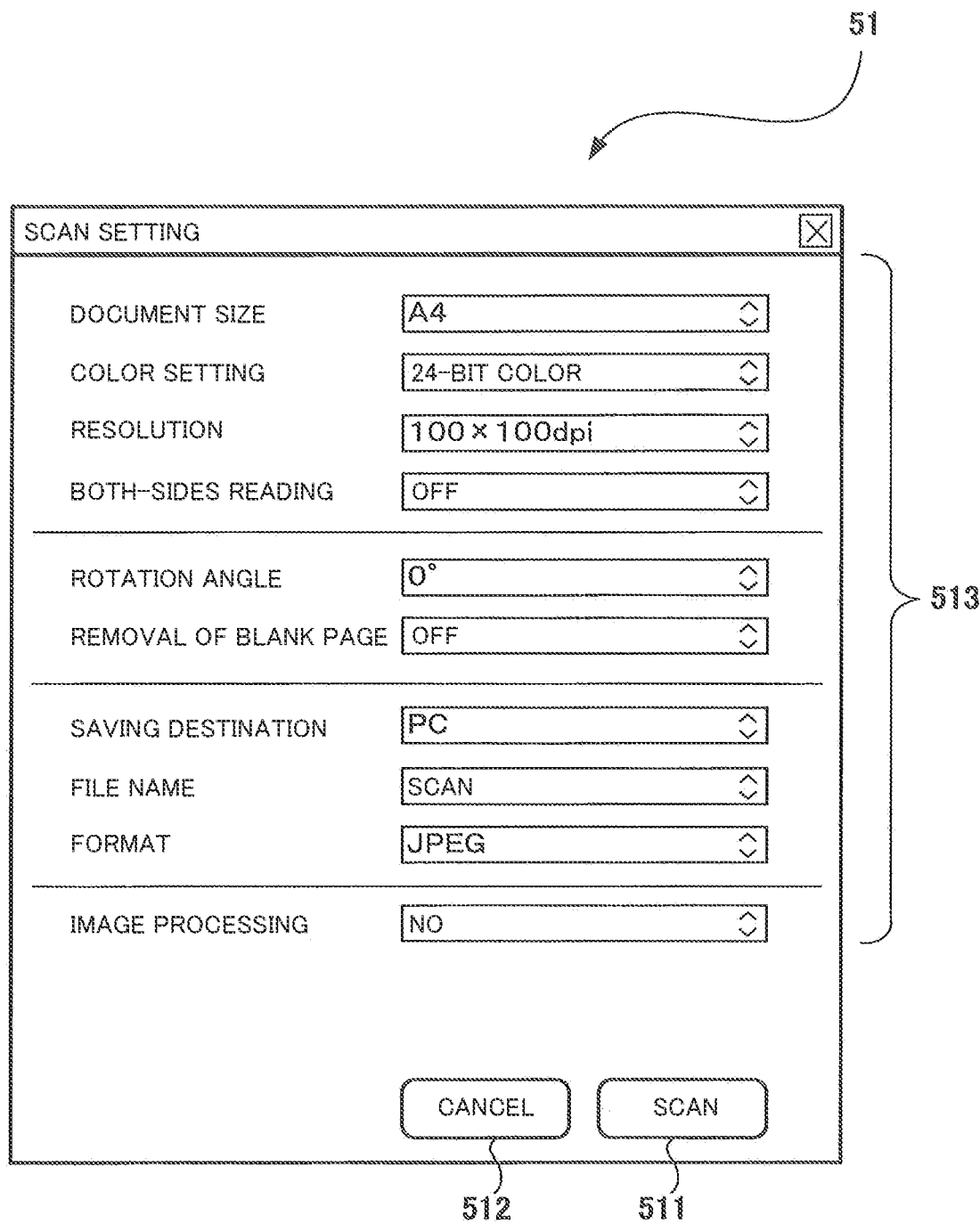
FIG. 6 is an explanatory diagram illustrating an example of a first setting screen.

The first setting screen is a screen for receiving all scan settings receivable by the selected scanner and the specialized scan control program 43 corresponding to the selected scanner. An example of the first setting screen is illustrated in FIG. 6. On a first setting screen 51 in the example of FIG. 6, a scan button 511, a cancel button 512, and item names and selection fields 513 for various scan settings that receive designation are displayed. At S303, default settings, settings selected last time, settings registered as favorites, and so on are displayed by the selected scanner or the specialized scan control program 43 conforming to the scanner.

Items and choices displayed in the selection fields 513 of the first setting screen 51 may be ones which can be designated in scanning using the specialized scan control program 43, and the items and the choices displayed in the selection fields 513 include items and choices incapable of being designated in scanning using the general-purpose scan control program 45. As the items and choices incapable of being designated in scanning using the general-purpose scan control program 45, for example, there are settings related to the configuration and functions of the scanner itself and settings for processing by the specialized scan control program 43. Note that items and choices capable of being designated only in the scanning using the general-purpose scan control program 45 are not contained or not displayed in the selection field 513.

As for the settings related to the scanner itself, for example, there are an item of both-sides reading and a choice of high-resolution reading. As for the settings related to the specialized scan control program 43, for example, there are an item of removal of a blank page and an item of image processing. In the following description, items and choices capable of being designated in scanning by using the specialized scan control program 43 and incapable of being designated in scanning by using the general-purpose scan control program 45 such as the item of both-sides reading, the choice of high-resolution reading, the item of removal of the blank page, and the item of image processing are included in a first particular setting.

The items and choices capable of being selected in the first setting screen 51 may differ according to each of capabilities of the selected scanner. For example, in a case where the selected scanner is a device capable of executing both-sides reading, a selection field for both-sides reading is displayed on the first setting screen 51, and the CPU 11 receives the setting of the both-sides reading. On the other hand, in a case where the selected scanner is a device incapable of executing both-sides reading, the selection field for the both-sides reading is not displayed on the first setting screen 51. For example, only in a case where the selected scanner is a device capable of executing reading in high resolution, a choice of high resolution is displayed so as to be selected as a choice of the resolution on the first setting screen 51, and the CPU 11 receives the setting of high resolution. The choice of the resolution in a range capable of being executed by the selected scanner is displayed on the first setting screen 51.

Moreover, in a case where the specialized scan control program 43 is a program having processing of executing character recognition processing and skew correction as the image processing with respect to image data obtained from the scanner, the character recognition processing and the skew correction are displayed so as to be selected as choices of the image processing on the first setting screen 51, and the CPU 11 receives designation of these choices. On the first setting screen 51, selection of the image processing is received in a range capable of being executed by the specialized scan control program 43 conforming to the selected scanner.

On the other hand, when it is determined that the first procedure has not been determined, that is, that the second procedure has been determined (S302: NO), the CPU 11 allows the user IF 13 to display a second setting screen (S304) and receives an operation to the displayed screen. At S304, default settings and settings selected last time are displayed by the general-purpose scan control program 45.

Figure 7:
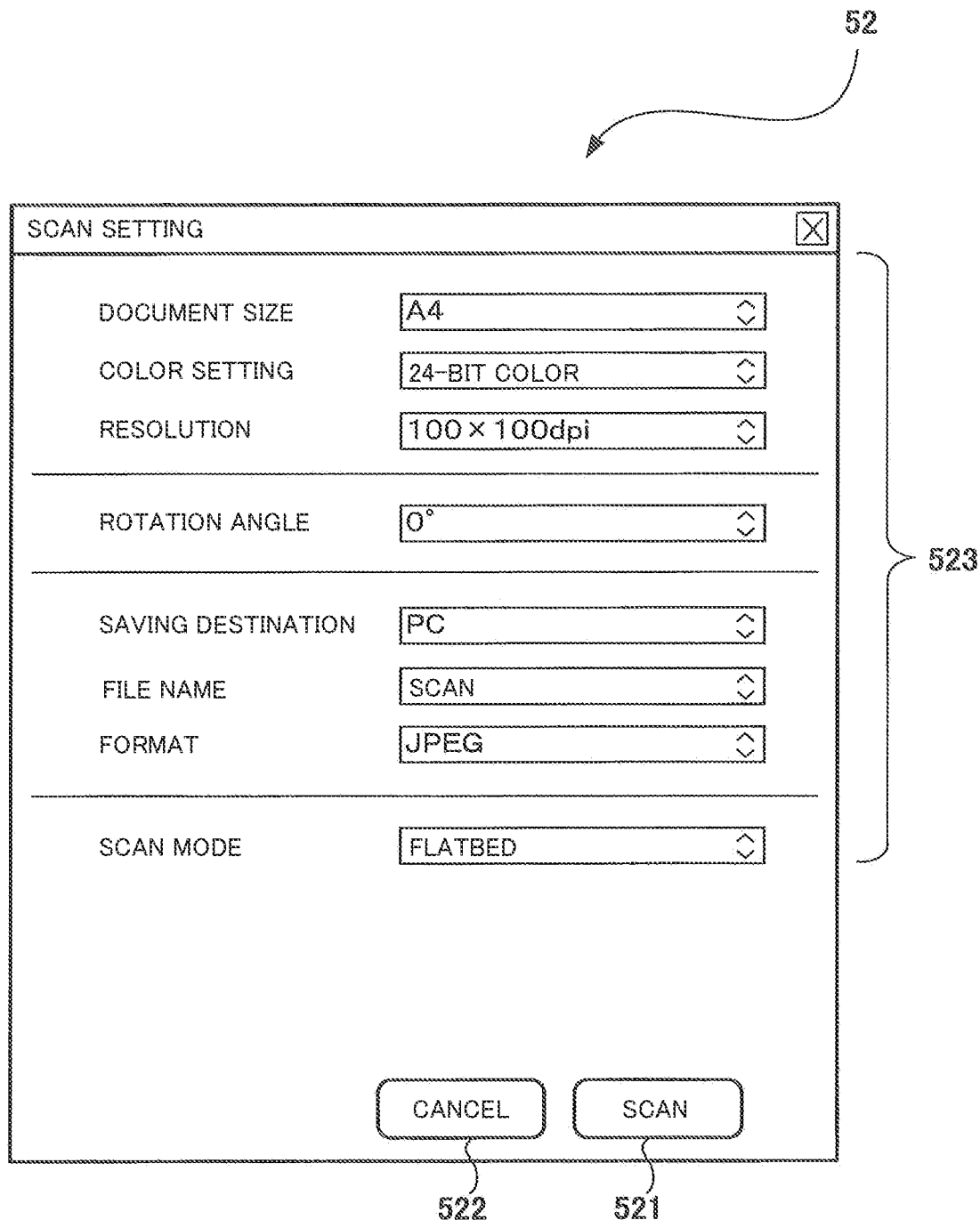
FIG. 7 is an explanatory diagram illustrating an example of a second setting screen.

The second setting screen is a screen for receiving scan settings receivable by the general-purpose scan control program 45. An example of the second setting screen is illustrated in FIG. 7. On a second setting screen 52 in the example of FIG. 7, a scan button 521, a cancel button 522, and various item names and selection fields 523 that receive settings are displayed.

The entire configuration of the second setting screen 52 is the same as that of the first setting screen 51. For example, the shape of an outer frame and the layout of various buttons on the second setting screen 52 are the same as those of the first setting screen 51, and the scan button 521 and the cancel button 522 on the second setting screen 52 are disposed at the same positions as the scan button 511 and the cancel button 512 on the first setting screen 51. The representation and the order of alignment of various items and choices are the same on the first setting screen 51 and the second setting screen 52.

However, items and choices which can be selected in the selection fields 523 on the second setting screen 52 differ from those on the first setting screen 51. The items and choices displayed on the second setting screen 52 may be designated in scanning using the general-purpose scan control program 45, and the items and choices displayed on the second setting screen 52 include items and choices incapable of being designated in scanning using the specialized scan control program 43. As choices capable of being designated in scanning using the general-purpose scan control program 45 and incapable of being designated in scanning using the specialized scan control program 43, for example, a scan mode can be cited. The scan mode is an item for designating a placing position of an original to be scanned, and the scan mode includes a flatbed and an ADF (Auto Document Feeder) as choices. In the following description, the items and choices capable of being designated in scanning by using the general-purpose scan control program 45 and incapable of being designated in scanning by using the specialized scan control program 43 such as the scan mode are included in a second particular setting.

The general-purpose scan control program 45 is a program capable of conforming to various types of scanners as described above, and scan settings capable of being designated by the general-purpose scan control program 45 are limited to some degree. Therefore, for example, it is highly likely that items such as both-sides reading and image processing capable of being designated only by scanning using the specialized scan control program 43 are not included in the second setting screen 52. It is also likely that the choice of high resolution is not displayed as the choice of resolution on the second setting screen 52.

After S303 or S304, the CPU 11 determines whether an instruction for ending the setting is received or not (S305). The CPU 11 determines that the instruction for ending the setting is received in a case where the CPU 11 receives an operation to any of the scan button 511 and the cancel button 512 on the first setting screen 51, the scan button 521 and the cancel button 522 on the second setting screen 52. When it is determined that the instruction for ending the setting is not received (S305: NO), the CPU 11 further receives an operation to the displayed screen.

On the other hand, when it is determined that the procedure has not been determined in the scanner selection processing (S301: NO), the CPU 11 temporarily determines to adopt the second procedure as the procedure of scan processing. (S306). Then, the CPU 11 obtains a scan history of the selected scanner and determines whether there is a history of executing the second procedure or not (S307). The scan history is information stored in the memory 12 by the scan application 42 or the OS 41 when the scan is executed. The scan history includes information of the control program used for execution of scanning, namely, information indicating whether the first procedure has been used or the second procedure has been used. In a case where there is the history of executing the second procedure, it is highly likely that the second procedure is selected, therefore, operability is improved when the second procedure is adopted.

When it is determined that there is the history of the second procedure (S307: YES), the CPU 11 causes the user IF 13 to display a third setting screen (S308), and receives an operation to the displayed screen. At S308, default settings or settings stored in the history are displayed in the general-purpose scan control program 45.

Figure 8:
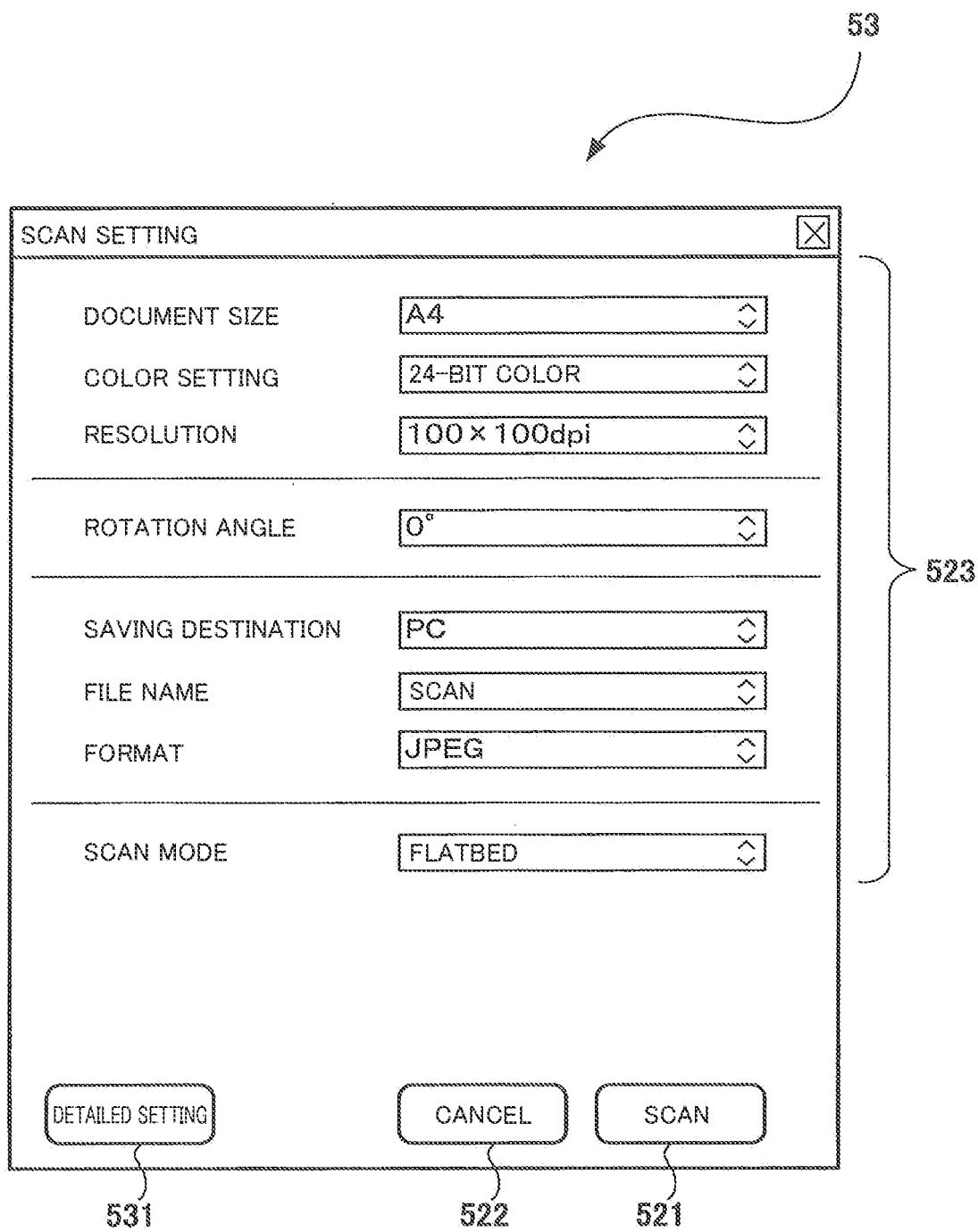
FIG. 8 is an explanatory diagram illustrating an example of a third setting screen.

The third setting screen is a screen for receiving scan settings receivable in the general-purpose scan control program 45. An example of the third setting screen is illustrated in FIG. 8. On a third setting screen 53 in the example of FIG. 8, a detailed setting button 531 is included in addition to the second setting screen 52 in the example of FIG. 7. The third setting screen 53 is the same screen as the second setting screen 52 except for the detailed setting button 531.

The CPU 11 determines whether the instruction for ending the setting is received or not according to an operation to the scan button 521 or the cancel button 522 on the third setting screen (S309). When it is determined that the instruction for ending the setting is not received (S309: NO), the CPU 11 determines whether an operation to the detailed setting button 531 is received or not (S310). When it is determined that the operation to the detail setting button 531 is not received either (S310: NO), the CPU 11 waits until an operation to any of the buttons is received.

When it is determined that there is no history of the second procedure (S307: NO), or when it is determined that the operation to the detailed setting button 531 is received (S310: YES), the CPU 11 causes the user IF 13 to display a fourth setting screen (S311), and receives an operation to the displayed screen.

The fourth setting screen is a screen for receiving designations of both items or choices which can be designated in scanning using the specialized scan control program 43 and items or choices which can be designated in scanning using the general-purpose scan control program 45. That is, items or choices included in the first setting screen 51 but not included in the second setting screen 52 (first particular setting) and items or choices included in the second setting screen 52 but not included in the first setting screen 51 (second particular setting) are also included in the fourth setting screen, in addition to items and choices included in both the first setting screen 51 and the second setting screen 52.

Figure 9:
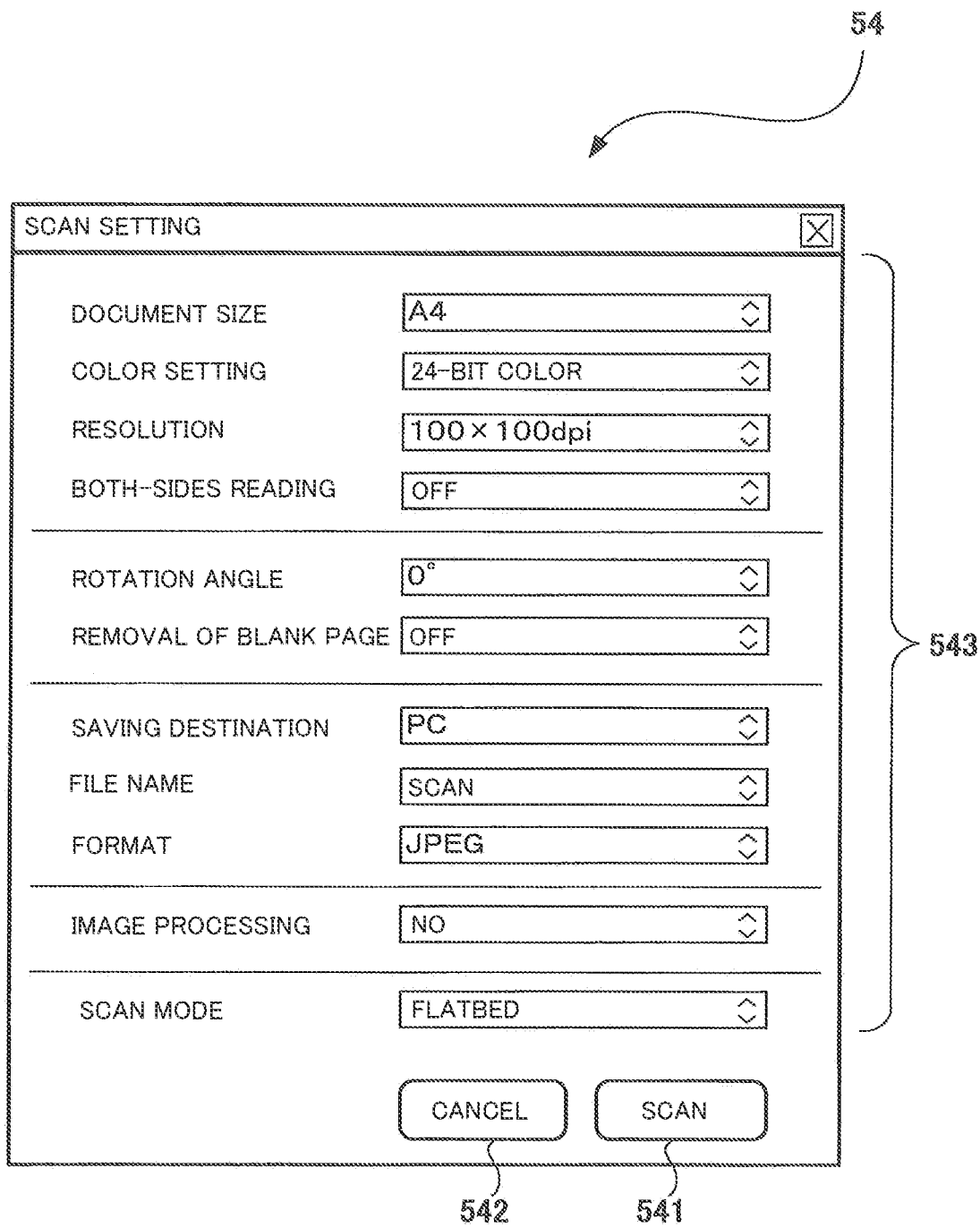
FIG. 9 is an explanatory diagram illustrating an example of a fourth setting screen.

An example of the fourth setting screen is illustrated in FIG. 9. On a fourth setting screen 54 in the example of FIG. 9, a scan button 541, a cancel button 542, various item names and selection fields 543 that receive settings are displayed. The entire configuration of the fourth setting screen 54 is the same as those of the first setting screen 51 or the second setting screen 52, and the scan button 541 and the cancel button 542 on the fourth setting screen 54 are disposed at the same positions as the scan button 511 and the cancel button 512 on the first setting screen 51. The representation and the order of alignment of various items and choices on the fourth setting screen 54 are the same as those on the first setting screen 51.

In the selection fields 543 of the fourth setting screen 54, the item of the scan mode as the second particular setting is displayed in addition to the items of the selection fields 513 on the first setting screen 51 illustrated in FIG. 6. Choices which can be selected in the selection fields 543 of the fourth setting screen 54 includes choices in the first particular setting and choices in the second particular setting.

The scan settings which can be designated on the third setting screen 53 are the same as the scan settings which can be designated on the second setting screen 52, which have a smaller range of items and choices as compared with the scan settings which can be designated on the first setting screen 51 in many cases. The detailed setting button 531 is a button configured to receive instructions for widening the range of items and choices which can be designated. The detailed setting button 531 is an example of an operator. When the detailed setting button 531 for widening the range of items and choices which can be designated is provided, settings executable only by the specialized scan control program 43 can be selected, which can suppress reduction in degree of freedom for settings. The fourth setting screen 54 displayed by the operation of the detailed setting button 531 is a screen having the similar configuration to the third setting screen 53 displayed until then, therefore, it is unlikely that the fourth setting screen confuses the user.

In a case where the scanner capable of executing both the first and second procedures is selected and there is no history of the second procedure, the fourth setting screen 54 is displayed to thereby widen the range of selection by the user.

Then, the CPU 11 determines whether any setting in the first particular setting is received or not (S312). In the fourth setting screen 54 displayed at S311 at the first time, "off", "no" and the like are selected as default choices related to respective items of both-sides reading, a rotation angle, removal of the blank page, image processing as items in the first particular setting, and a choice of not-high resolution is selected as resolution. The CPU 11 determines that designation of the first particular setting is received in a case where the CPU receives an instruction of changing these items from the default choices.

When it is determined that the designation of the first particular setting is received (S312: YES), the CPU 11 determines to adopt the first procedure as the procedure of scan processing from the second procedure determined at S306 (S313). That is, the CPU 11 determines to use the specialized scan control program 43 as the control program used for scan processing.

Then, the CPU 11 disables the setting of the second particular setting (S314). As a style of disabling the setting, for example, the CPU 11 does not display choices of the second particular setting, or grays out choices of the second particular setting. In a case where the first procedure is determined to be adopted, incorrect setting can be prevented in advance by disabling the second particular setting.

When it is determined that the designation of the first particular setting is not received (S312: NO), the CPU 11 determines whether the first particular setting which has been received before is cancelled or not (S315). The CPU 11 determines that the first particular setting is cancelled in a case where items in the first particular setting are returned to default choices. In a case where the CPU 11 receives a plurality of first particular settings, the CPU 11 determines YES at S315 in a case where all the plurality of first particular settings are cancelled. When it is determined that the first particular setting is cancelled (S315: YES), the CPU 11 releases the disabled setting of the second particular setting disabled at S314 (S316). That is, the second particular setting is set to a setting capable of being designated.

When it is determined that the first particular setting is not cancelled (S315: NO), the CPU 11 determines whether the designation of the second particular setting is received or not (S317). In the fourth setting screen 54 displayed at S311 at the first time, a default placing position of an original by the selected scanner ("flatbed" in the drawing) is selected in the item of the scan mode as the item in the second particular setting. In a case where the instruction of changing the item in the scan mode from the default choice is received, the CPU 11 determines that the designation of the second particular setting is received. After S316, or when it is determined that the designation of the second particular setting is received (S317: YES), the CPU 11 determines to adopt the second procedure as the procedure of scan processing (S318). That is, the CPU 11 determines to use the general-purpose scan control program 45 as the control program used for scan processing.

Even in a case where the first particular setting is designated once, the second procedure can be executed in the case where the designation of the first particular setting is cancelled, therefore, the second procedure is adopted. When switched to settings which can be designated in scanning using the general-purpose scan control program 45, the general-purpose scan control program 45 can be preferentially used by changing the procedure to the second procedure. Note that, the setting which can be designated in scanning using the general-purpose scan control program 45 and which is included in the first particular setting is an example of a second scan setting.

In a case where the second particular setting is received, the second procedure is automatically determined to be adopted, thereby preferentially using the general-purpose scan control program 45, as a result, possibility of confusing the user can be reduced.

After S314 or S318, or when it is determined that the designation of the second particular setting is not received (S317: NO), the CPU 11 determines whether an instruction of ending the setting by the operation to the scan button 541 or the cancel button 542 in the fourth setting screen 54 is received or not (S319). When it is determined that the instruction of ending the setting is not received (S319: NO), the CPU 11 returns to S312 and waits until any instruction is received.

When it is determined that the instruction of ending the setting is received in any of setting screens (S305: YES, S309: YES, or S319: YES), the CPU 11 ends the scan setting processing and returns to the scan execution processing. In a case where the instruction of ending the setting is received without receiving any operation on the fourth setting screen 54 displayed at S311, the second procedure is determined as the procedure of scan processing because the second procedure is determined at S306.

Explanation returns to the scan execution processing in FIG. 3. In the scan execution processing, the CPU 11 determines whether the received instruction of ending the setting is a scan instruction by the operation to the scan button in each setting screen or not after the scan setting processing of S102 (S103). When it is determined that the scan instruction is received (S103: YES), the CPU 11 determines whether the first procedure has been determined to be adopted or not (S104).

When it is determined that the first procedure has been determined to be adopted (S104: YES), the CPU 11 passes information of scan settings to the specialized scan control program 43 and instructs execution of scanning (S105). According to this, the specialized scan control program 43 generates a scan command and transmits the command to the designated scanner. As a result, the scanner reads the image of the original and transmits the read result to the specialized scan control program 43. The CPU 11 receives image data from the scanner through the specialized scan control program 43 (S106).

The CPU 11 determines whether execution of the image processing is selected as the scan setting or not (S107). When it is determined that the execution of the image processing is selected (S107: YES), the CPU 11 executes the image processing of image data of the read result by executing the selected processing (S108). As described above, the image processing includes, for example, the character recognition processing and the skew correction processing of image data as described above. The image processing may be processing using the specialized scan control program 43.

On the other hand, when it is determined that the first procedure has not been determined to be adopted, namely, the second procedure has been determined to be adopted (S104: NO), the CPU 11 passes the instruction for executing scanning using the general-purpose scan control program 45 to the OS 41 (S109). According to this, the OS 41 executes scanning using the general-purpose scan control program 45, and transmits the scan command to the scanner. As a result, the scanner reads the image of the original and transmits the read result to the OS 41. The CPU 11 receives the image data from the OS 41 (S110).

After S108 or S110, or when it is determined that execution of the image processing is not selected (S107: NO), the CPU 11 saves the image data in a saving destination designated in the scan setting (S111). The CPU 11 further stores the procedure of executed scan processing in the memory 12 as the history of the procedure of scan processing of the selected scanner (S112). After S112, or when it is determined that the instruction of ending the setting received in the scan setting processing of S102 is the cancel instruction, not the scan instruction (S103: NO), the CPU 11 ends the scan execution processing.

As described above in detail, in a case where the operation to the first particular setting capable of being designated in scanning using the specialized scan control program 43 and incapable of being designated in scanning using the general-purpose scan control program 45 is received, the specialized scan control program 43 is automatically determined as the program used for the scan processing in the scan system 100 according to the embodiment. Accordingly, the user can save trouble of selecting the program and the possibility of confusing the user can be reduced.

The embodiment is merely an example, and does not limit the disclosure at all. Therefore, various modifications and alterations may naturally be made in the present disclosure within a scope not departing from the gist thereof. For example, a smartphone or a tablet computer may be used instead of the PC 1. The numbers of PCs or scanners configuring the scan system 100 are not limited to the illustrated example, and one or more devices may be preferably used, respectively.

In the embodiment, the procedure is determined to be adopted in advance based on information of scanner registration by the OS 41 or the search result of scanners; however, it is not always necessary to determine to adopt the procedure in advance. That is, S202, S203, S206, and S207 as the scanner selection processing are not always necessary.

Moreover, for example, the second procedure is temporarily determined to be adopted in the case where the both the first procedure and the second procedure are applicable to the scanner in the embodiment; however, the present disclosure is not limited to this. For example, it is also preferable that the second procedure is adopted in a case where there is the history of the second procedure and that the first procedure is adopted in a case where there is no history. It is further preferable that the first procedure is temporarily determined to be adopted regardless of the history and that the fourth setting screen is displayed.

For example, in a case where neither the first particular setting nor the second particular setting is received in the case where the scanner can adopt both the first procedure and the second procedure, the second procedure is determined at S306 in the embodiment; however, it is also preferable to adopt the first procedure or it is possible to inquire of the user.

For example, every time when receiving any of operations of designation of the first particular setting (YES at S312), designation of the second particular setting (YES at S317), and cancel of designation of the first particular setting (YES at S315), the first procedure or the second procedure is determined to be adopted in the embodiment. However, the present disclosure is not limited to this, and it is also preferable that the procedure of scan processing is determined based on the selected scan setting at the timing when the setting with respect to the setting screen is completed. Specifically, when the CPU 11 determines that the operation to the scan button is received in each setting screen (YES at S103), the CPU 11 may determine to adopt the first procedure in the case where designation in the first particular setting is included in the scan settings, and to adopt the second procedure in the case where designation in the second particular setting is included, or neither designation in the first particular setting nor designation in the second particular setting is included.

Moreover, for example, all configurations of the setting screens illustrated in respective drawings are examples, in which any display can be applied as long as selections of respective items or choices by the user can be received, and information other than illustrated information may be displayed. For example, information of a selected scanner, information indicating a scanner condition, information of a connection state with respect to the scanner, and an item configured to receive the selection of the scanner may be displayed.

The scan application 42 may have a function of receiving instructions for edition or printing of images in image data obtained from the scanner.

In arbitrary flowcharts disclosed in the embodiment, a plurality of processing in a plurality of arbitrary steps may be arbitrarily changed in the execution order or may be executed in parallel within a range in which no inconsistency occurs in the processing contents.

The processing disclosed in the embodiment may be executed by a single CPU, a plurality of CPUs, hardware such as ASIC or combinations of them. The processing disclosed in the embodiment may be realized in various states such as a recording medium storing programs or methods for executing the processing.

What is claimed is:

1. A non-transitory storage medium storing a plurality of instructions readable by a computer of an information processing apparatus, the information processing apparatus comprising a display, an operation unit, and a communication interface connectable to a scanner, the information processing apparatus storing a first execution program and a second execution program different from the first execution program each as an execution program that executes scan processing for causing the scanner to scan an original and causing the information processing apparatus to receive a read result from the scanner,
    wherein, when executed by the computer, the plurality of instructions cause the information processing apparatus to:
        display a setting screen for receiving a scan setting used for the scan processing on the display, the scan setting including a first particular setting capable of being designated in scan processing executed by the first execution program and incapable of being designated in scan processing executed by the second execution program; and
        in a case where the first particular setting is designated on the setting screen by an operation to the operation unit, determine to adopt the first execution program as the execution program that executes the scan processing.

2. The non-transitory storage medium according to claim 1,
    wherein, when executed by the computer, the plurality of instructions cause the information processing apparatus to change from the first execution program to the second execution program as the execution program that executes the scan processing in a case where the scan setting is switched from the first particular setting to a second scan setting by the operation to the operation unit after the first execution program is determined to be adopted as the execution program that executes the scan processing, the second scan setting being a scan setting capable of being designated in the scan processing executed by the second execution program.

3. The non-transitory storage medium according to claim 1,
    wherein the scan setting include a second particular setting capable of being designated in the scan processing executed by the second execution program and incapable of being designated in the scan processing executed by the first execution program, and
    wherein, when executed by the computer, the plurality of instructions cause the information processing apparatus to determine to adopt the second execution program as the execution program that executes the scan processing in a case where the second particular setting is designated by the operation to the operation unit on the setting screen.

4. The non-transitory storage medium according to claim 1,
    wherein the scan settings include a second particular setting capable of being designated in the scan processing executed by the second execution program and incapable of being designated in the scan processing executed by the first execution program, and
    wherein, when executed by the computer, the plurality of instructions cause the information processing apparatus to disable designation of the second particular setting in the case where the first particular setting is designated by the operation to the operation unit on the setting screen.

5. The non-transitory storage medium according to claim 1,
    wherein the first particular setting includes a setting used in processing capable of being executed by the scanner in the scan processing executed by the first execution program as well as incapable of being executed by the scanner in the scan processing executed by the second execution program.

6. The non-transitory storage medium according to claim 1,
    wherein, when executed by the computer, the plurality of instructions cause the information processing apparatus to execute image processing to the read result received from the scanner by the first execution program, and
    wherein the first particular setting includes a setting used in the image processing.

7. The non-transitory storage medium according to claim 1,
    wherein, when executed by the computer, the plurality of instructions cause the information processing apparatus:
        to execute determining processing of determining to adopt the first execution program as the execution program that executes the scan processing in a case where the scanner capable of executing the scan processing executed by the second execution program is not registered in the information processing apparatus; and
        not to determine to adopt the first execution program as the execution program based on the designation of the first particular setting on the setting screen in a case where the first execution program is determined to be adopted as the execution program by the determining processing.

8. The non-transitory storage medium according to claim 1,
    wherein, when executed by the computer, the plurality of instructions cause the information processing apparatus to:
        search a scanner capable of executing the scan processing executed by the first execution program;

determine to adopt the second execution program as the execution program that executes the scan processing when the scanner capable of executing the scan processing executed by the first execution program is not searched; and in a case where the second execution program is determined to be adopted as the execution program that executes the scan processing, disable designation of the first particular setting so as not to determine to adopt the first execution program as the execution program executing the scan processing by designation of the first particular setting.

9. The non-transitory storage medium according to claim 1, wherein, when executed by the computer, the plurality of instructions cause the information processing apparatus to:

in a case where a history of the scan processing executed by the second execution program is stored in a memory of the information processing apparatus, determine to adopt the second execution program as the execution program that executes the scan processing; and display the setting screen on the display in a state in which designation of the first particular setting is not accepted in a case where the second execution program is determined as the execution program executing the scan processing.

10. The non-transitory storage medium according to claim 9, wherein, in a case where the setting screen is displayed in the state in which the designation of the first particular setting is not accepted, an operator for receiving an operation of accepting the first particular setting is contained in the setting screen.

11. The non-transitory storage medium according to claim 1, wherein the information processing apparatus includes an operating system, and wherein the second execution program is used as a scan control function of the operating system and the first execution program is not used as the scan control function of the operating system.

12. A scan system comprising:

an information processing apparatus; and a scanner configured to communicate with the information processing apparatus, wherein the information processing apparatus is configured to:

store a first execution program and a second execution program different from the first execution program each as an execution program that executes scan processing for causing the scanner to read an original and causing the information processing apparatus to receive a read result from the scanner, display a setting screen for receiving a scan setting used for the scan processing on a display, the scan setting including a first particular setting capable of being designated in a scan processing executed by the first execution program and incapable of being designated in a scan processing executed by the second execution program, and in a case where the first particular setting is designated on the setting screen, determine to adopt the first execution program as the execution program that executes the scan processing.

* * * * *